Patented June 5, 1928.

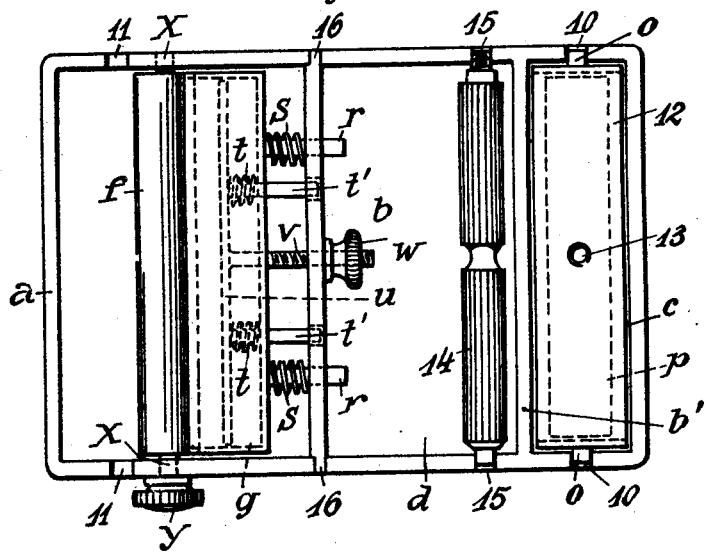
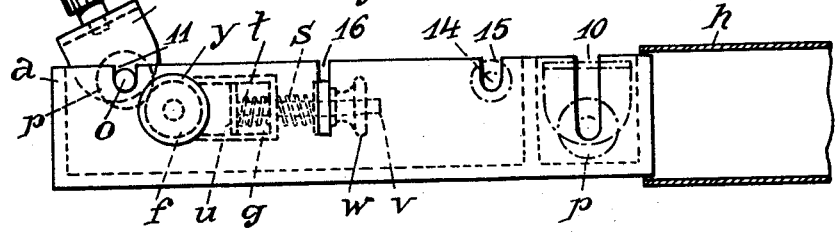

1,672,206

UNITED STATES PATENT OFFICE.

RUDOLF GEHRING, OF SONTHOFEN, ALLGAU, GERMANY.

FINGERPRINT-TAKING DEVICE.

Application filed January 6, 1927, Serial No. 159,397, and in Germany January 11, 1926.

My invention relates to means for taking finger prints, for instance in the identification service of the police. It is an object of my invention to provide a self-contained, small and handy device of this kind. To this end I provide a casing which is combined with a lid, preferably a sliding lid and in this casing I arrange an inking pad, an inking roller and a transfer roller with its handle. The ink is preferably transferred to the lid of the casing, and the finger of the person to be identified is applied to the lid for inking. A preferred embodiment of my invention resembles a match box, an outer casing of rectangular cross-section which is open at both ends surrounding an inner casing containing the parts aforesaid.

In the drawings affixed to this specification and forming part thereof a device embodying my invention is illustrated diagrammatically by way of example.

In the drawings,

Fig. 1 is a plan view of the inner casing with the outer casing or lid removed,

Fig. 2 is an elevation of the inner casing and a section through the outer casing, Fig. 3 is an elevation showing the transfer roller and its handle removed from the inner casing.

Referring to the drawings, $a$ is the inner casing, which may be of any suitable shape and is here shown as a rectangular box open at the top, $b'$ is a transverse partition subdividing the casing into a small compartment $c$ at the rear in which the bracket 12 of the transfer roller $p$ is carried when not in use, and a larger compartment $d$ in front in which the support $b$ for the inking pad, the inking roller $f$ and the handle 14 of the transfer roller $p$ are carried. 16 are slots in the side walls of the inner casing $a$ in which the support $b$ is detachably carried. $g$ is a channel-shaped container for the inking pad, $r$, $r$ are pins projecting from the end wall of the container $g$ and extending through the support $b$, $s$, $s$ are springs interposed between the support $b$ and the end wall of the container $g$, $u$ is a rectangular plate slidable in the container $g$ and provided with springs $t$, $t$ on pins $t'$, $t'$ which project through the end wall of the container $g$, holes being provided in the support $b$ so as not to interfere with the motion of the pins. The springs $t$ tend to force the plate $u$ toward the inking roller $f$ which is rotatably carried in the side walls of the inner casing $a$ on journals $x$, $x$ and provided with a handle $y$ on the outside for rotation. $v$ is a threaded pin projecting to the rear from the centre of the plate $u$, and $w$ is a nut on the pin which is abutted against the support $b$. The inking pad is inserted between the inking roller $f$ and the plate $u$ and the relative distance of the plate $u$ and the space for the pad is regulated by the nut $w$.

The transfer roller $p$ is rotatably carried about journals $o$ in a bracket 12 which is provided with a threaded hole 13, and 14 is a handle which is adapted to be secured in the threaded hole 13 with one of its ends. 11, 11 are slots in the side walls in front of the printing roller $f$ through which the journals $o$ of the transfer roller $p$ may pass when the roller is placed in contact with the inking roller.

When not in use, the handle is unscrewed from the bracket 12 and inserted in slots 15, 15 of the side walls of the casing in the vicinity of the partition $b'$ and the bracket 12 is placed in the compartment $c$, its journals $o$ being inserted in slots 10.

$h$ is the outer casing in which the inner casing $a$ is held when not in use, one of the side walls of the outer casing being slotted for the handle $y$. Instead of a complete casing, a sliding or hinged lid may be arranged on the inner casing, or any other suitable means for closing the casing may be provided.

In operation, the inner casing $a$ is slid out of the outer casing $h$, the handle 14 is removed from its slots 15, 15 and is screwed into the hole 13 of the bracket 12. The bracket with the transfer roller $p$ is removed from the compartment $c$ and the transfer roller is presented to the inking roller $f$ by inserting its journals $o$, $o$ in the slots 11, 11, and placed in contact with the roller by tilting the handle 14 to the left in Fig. 2. Ink is applied to the transfer roller by rotating the handle $y$, the transfer roller is removed and the top of the outer casing $h$ is inked. If, instead of a casing, a lid or the like is provided, the ink will obviously be applied to that, but it may also be applied directly to the finger tips by the roller instead of any intermediate carrier.

The container $g$ for the inking pad is removed from the inner casing $a$ by pulling back the plate $u$ by means of the nut $w$ until the container $g$ is out of reach of the inking roller *f*. The support *b* may now be removed from the slots 16 of the inner casing *a* and the inking pad in the container *g* may conveniently be renewed.

The device is very small and is operated conveniently and without soiling, as all parts may be operated without coming into direct contact with the ink.

I wish it to be understood that I do not desire to be limited to the exact details of construction shown and described, for obvious modifications will occur to a person skilled in the art.

I claim:—

1. Device for taking finger prints comprising a casing, an inking roller and means for inking said roller carried in said casing, a bracket adapted to be placed in said casing, and a transfer roller rotatably carried in said bracket.

2. Device for taking finger prints comprising a casing, an inking roller and means for inking said roller carried in said casing, a bracket adapted to be placed in said casing, a transfer roller rotatably carried in said bracket, and a detachable handle on said bracket.

3. Device for taking finger prints comprising a casing, an inking roller rotatably carried in said casing, an ink container in said casing, means for forcing said container toward said inking roller at resilient pressure, means for withdrawing it from said inking roller, and a transfer roller adapted to be placed in said casing.

4. Device for taking finger prints comprising a casing, an inking roller rotatably carried in said casing, an ink container in said casing, a plate inserted in said container, means for displacing said container in parallel with respect to said inking roller, means for displacing said plate in said container, and a transfer roller adapted to be placed in said casing.

5. Device for taking finger prints comprising a casing, an inking roller rotatably carried in said casing, an ink container in said casing, a detachable support inserted in said casing, means for guiding said container on said support so as to displace it in parallel with respect to said inking roller, and a transfer roller adapted to be placed in said casing.

6. Device for taking finger prints comprising a casing, an inking roller rotatably carried in said casing, an ink container in said casing, a detachable support inserted in said casing, means for guiding said container on said support so as to displace it in parallel with respect to said inking roller, a plate inserted in said container, means abutted on said support for displacing said plate, and a transfer roller adapted to be placed in said casing.

In testimony whereof I affix my signature.

RUDOLF GEHRING.